(12) United States Patent
Grubb et al.

(10) Patent No.: US 10,521,683 B2
(45) Date of Patent: Dec. 31, 2019

(54) GLARE REDUCTION

(71) Applicant: SEEING MACHINES LIMITED, Fyshwick (AU)

(72) Inventors: Grant Grubb, Ainslie (AU); Sebastien Rougeaux, O'Connor (AU)

(73) Assignee: Seeing Machines Limited, Fyshwick (AU)

( * ) Notice: Subject to any disclaimer, the term of this patent is extended or adjusted under 35 U.S.C. 154(b) by 0 days.

(21) Appl. No.: 15/552,206

(22) PCT Filed: Dec. 31, 2015

(86) PCT No.: PCT/AU2015/000769
§ 371 (c)(1),
(2) Date: Aug. 18, 2017

(87) PCT Pub. No.: WO2016/131075
PCT Pub. Date: Aug. 25, 2016

(65) Prior Publication Data
US 2018/0039846 A1 Feb. 8, 2018

(30) Foreign Application Priority Data
Feb. 20, 2015 (AU) ............... 2015900592

(51) Int. Cl.
*G06K 9/20* (2006.01)
*G06N 20/00* (2019.01)
*G06K 9/00* (2006.01)

(52) U.S. Cl.
CPC ....... *G06K 9/2027* (2013.01); *G06K 9/00221* (2013.01); *G06K 9/00597* (2013.01); *G06K 9/00604* (2013.01); *G06N 20/00* (2019.01)

(58) Field of Classification Search
CPC ............. G06K 9/2027; G06K 9/00597; G06K 9/00221; G06K 9/00845; G06K 9/00604; G06N 20/00
See application file for complete search history.

(56) References Cited

U.S. PATENT DOCUMENTS

| 6,088,470 A | 7/2000 | Camus et al. |
| 7,043,056 B2 | 5/2006 | Edwards et al. |

(Continued)

FOREIGN PATENT DOCUMENTS

| EP | 1655687 | 5/2006 |
| EP | 1862111 | 12/2007 |

(Continued)

OTHER PUBLICATIONS

Morimoto, C.H. et al., "Pupil Detection and Tracking Using Multiple Light Sources", Image and Vision Computing, vol. 18, Issue 4, pp. 331-335, 2000.

(Continued)

*Primary Examiner* — Phuoc Tran
(74) *Attorney, Agent, or Firm* — Jason P. Mueller; Adams and Reese, LLP

(57) ABSTRACT

A system and method are provided for actively illuminating and capturing images of an object, such as a driver of a vehicle to reduce glare. The system includes a video imaging camera orientated to generate images of the subject object (e.g., eye(s)) in successive video frames. The system also includes first and second light sources operable to illuminate the object one at a time. The system further includes a processor for processing the image by performing a functional operation to reduce glare in the image. The system may remove glare caused by the illuminators and by external energy sources.

19 Claims, 8 Drawing Sheets

(56) References Cited

U.S. PATENT DOCUMENTS

| | | | |
|---|---|---|---|
| 7,646,422 B2 | 1/2010 | Kisacanin et al. | |
| 7,747,068 B1 | 6/2010 | Smyth et al. | |
| 2004/0197011 A1* | 10/2004 | Camus | G06K 9/00597 382/103 |
| 2006/0087582 A1 | 4/2006 | Scharenbroch et al. | |
| 2008/0199165 A1 | 8/2008 | Ng et al. | |
| 2010/0066975 A1 | 3/2010 | Rehnstrom | |
| 2014/0056529 A1* | 2/2014 | Ruan | G06K 9/00597 382/199 |
| 2014/0140577 A1 | 5/2014 | Hanita et al. | |
| 2014/0185924 A1 | 7/2014 | Cao et al. | |
| 2015/0296135 A1* | 10/2015 | Wacquant | G06F 3/013 348/207.11 |

FOREIGN PATENT DOCUMENTS

| | | |
|---|---|---|
| EP | 1908396 | 9/2008 |
| EP | 2587341 | 5/2013 |
| JP | 2010057683 A | 3/2010 |
| WO | 1999/027412 | 6/1999 |

OTHER PUBLICATIONS

Sun et al. | "Deep convolutional network cascade for facial point detection", Computer Vision and Pattern Recognition (CVPR), 2013 IEEE Conference.

Wei Chuansheng et al. | "Combining shape regression model and isophotes curvature information for eye center localization", 2014, 7th international Conference on Biomedical Engineering and Informatics, Oct. 14, 2014, pp. 156-160.

Hsu R-L et al. | "Face Modeling for Recognition", Proceedings 2001 International Conference on Image Processing, 2001, Thessaloniki, Greece, Oct. 7-10, 2001.

* cited by examiner

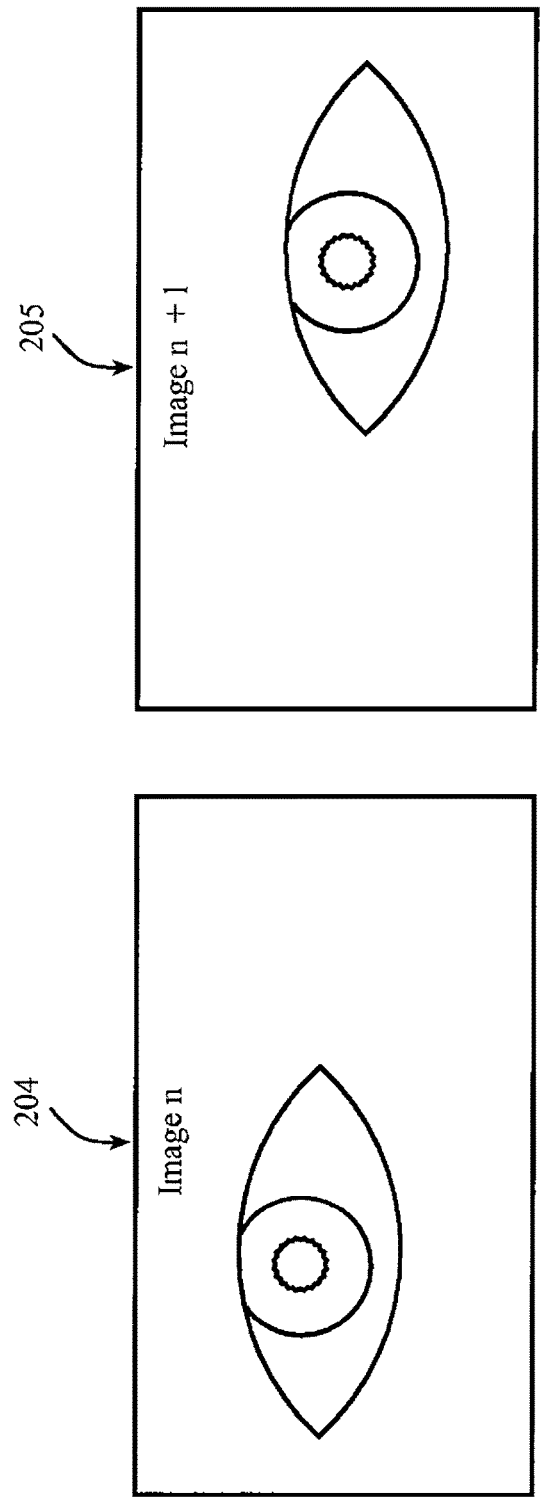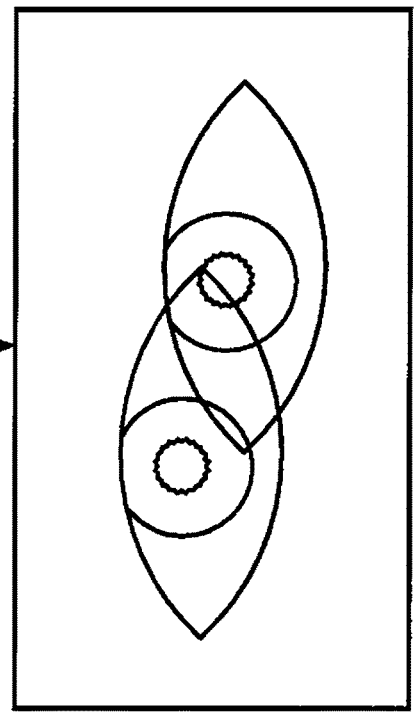
FIGURE 2A
FIGURE 2B
FIGURE 2C

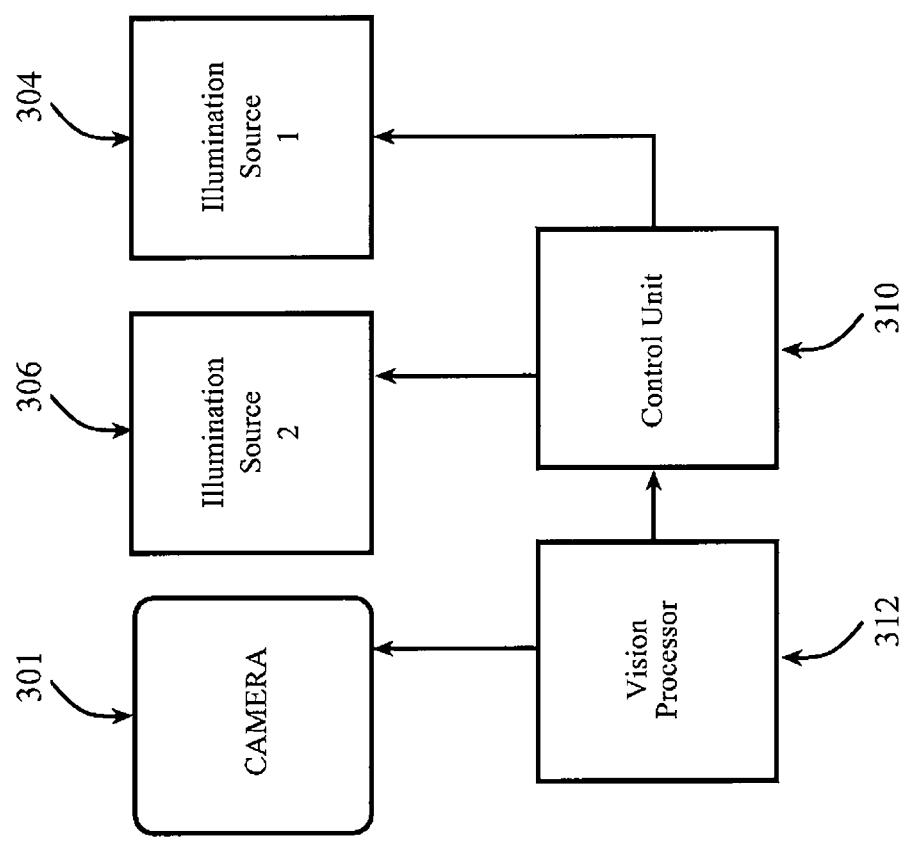

GLARE REDUCTION

TECHNICAL FIELD

The present invention generally relates to an imaging system and, more particularly, relates to a system and method for illuminating, capturing, and processing images of an object, such as a person's eye(s), in a manner that reduces glare within the images.

BACKGROUND OF THE INVENTION

A variety of imaging systems have been proposed for use in equipment and on-board vehicles to monitor a driver and/or passenger(s) in an automotive vehicle. Some proposed imaging systems include one or more cameras focused on the operator or driver of the equipment or vehicle to capture images of the operator's or driver's face. The captured video images are processed to determine various facial characteristics of the eyes, face, and head. Given the determined facial characteristics, such as a driver's eye positioning and gaze, vehicle control systems can provide enhanced vehicle functions.

Many conventional approaches that employ active light illumination suffer from drawbacks. In particular, when an illuminated subject is wearing corrective lens eye glasses or sunglasses, the geometry (e.g., convex shape) of the glasses may reflect the light illuminated onto the image that is acquired by the imaging camera. This reflection of the illumination source is generally seen as a glare on the subject's glasses. The resultant glare may occur at the regions of interest near the eye(s) of the subject, thus inhibiting the ability to recognize imaged facial characteristics of the eyes, face, and head.

One approach that addresses the glare problem is disclosed in U.S. Pat. No. 7,646,422 entitled "Illumination and imaging system with glare reduction and method therefore." The system disclosed in the aforementioned patent employs first and second light sources spaced from a centrally located video imaging camera and involves capturing successive images under illumination of different combinations of the light sources. A pixel-wise minimisation algorithm is performed on the sequence of images (such as an image pair) to produce a composite image in which glare is reduced.

Reduced glare images allow for enhanced imagery, which is particularly advantageous for use in a vehicle where an object driver of the vehicle may be wearing a corrective lens and glare may be present. Although the above described patent seems to solve some glare problems, it does not account for image motion between consecutive images. In a desired vehicle eye monitoring system, normal head movements should not result in interruption in monitoring the \ subject, operator or driver. As described in the above patent, when a driver's head or eye has moved between images and a pixel-wise "min" operation is performed on the images, then the resulting image may contain artifacts or 'ghosting.' These artifacts may totally negate the intended glare reduction effect which can be very detrimental to the analysis of the images. Ultimately, there will be a negative effect on the continuous operation and reliability of the above-described system. An improved method or system is needed to compensate for movement within the captured images, providing increased reliability of the on-board vehicle monitor systems. Given the determined facial characteristics, such as the operator's eye positioning and gaze, alternative vehicle or equipment control systems may provide higher safety and reliability levels for monitoring particular movements or behaviors.

Any discussion of the prior art throughout the specification should in no way be considered as an admission that such prior art is widely known or forms part of common general knowledge in the field.

SUMMARY OF THE INVENTION

A system and method are provided for illuminating, capturing and processing images of a subject, operator, driver and/or passenger(s) in a vehicle or operating equipment. In particular, one or more facial features are used in tracking or monitoring a driver, such as eyes. Images of a driver's eyes may be blemished by light reflection and glare. Images are captured and processed in a manner that reduces the glare caused by light reflections. The present invention is particularly useful for monitoring a passenger, such as a driver of a vehicle wearing corrective lenses which can cause glare upon reflection of the illuminated light.

The system includes an imaging camera orientated to generate images of one or more facial features in successive image fields or frames. The system also includes first and second light sources located at first and second locations that illuminate the object. The first and second light sources generate light sources in sync with the image, fields or frames from the camera. Images are captured and the system further includes processing of the images to enhance or improve the image of an object or to reduce undesirable attributes of the image such as glare and unwanted or undesirable reflections.

The described system may be applied and used in a multitude of environments. One example is monitoring a driver or passengers of a vehicle. Additionally, the described system may be applied to an operator using or operating any other equipment, such as machinery or in a specific example, an aircraft control person. A subject, operator, driver and/or passenger(s), an operator of equipment or anyone being monitored, will herein be referred to as a subject. In addition, references to image n+1, n, n−1 etc. generally refer to a prior image, a current image and future image, etc.

In accordance with a first aspect of the present invention, there is provided an image processing system including:

two or more illumination devices positioned to selectively illuminate a face of a subject from respective illumination angles;

a camera positioned to capture images of at least a portion of the subject's face including at least one eye;

a controller configured to control the illumination devices and camera such that a first image is captured under a first illumination condition having first glare properties and a second image is captured under a second illumination condition having second glare properties, wherein the first and second illumination conditions are defined by the illumination devices; and a processor adapted to fit an eye model to the first and second images based on at least one detected characteristic of the at least one eye in the first and second images to obtain information on the position and shape of the at least one eye.

In one embodiment the processor is further adapted to:
determine corresponding pixels from the first and second images that relate to the same region of the at least one eye;
compare the brightness values of the corresponding pixels; and selectively modify brightness values of one or more of the corresponding pixels in the first image and/or the second image to reduce glare.

In some embodiments the at least one characteristic includes an eye position and the processor is further adapted to process the first and second images to determine a position of the at least one eye in the images. In one embodiment the at least one characteristic include a degree of eye openness and the processor is further adapted to perform an eye opening measurement to determine a degree of openness of the at least one eye. In another embodiment the at least one characteristic includes a pupil contour and the processor is further adapted to process the first and second images to determine a direction of eye gaze. The eye model is preferably generated based on machine learning of a set of training data. In one embodiment the machine learning includes performing a fern-based regression algorithm. In another embodiment the machine learning includes performing a convolutional neural network algorithm.

In one embodiment the eye model includes a reference data for determining a degree of eye openness. In one embodiment the model includes at least one reference point defined by features of an eye. The at least one reference point preferably includes a pupil, eye corners and points along an upper and lower eyelid. In one embodiment the model includes a mesh structure defined with respect to the at least one reference point. The mesh structure preferably includes triangular elements with three vertices. Coordinates of pixels in regions of the at least one eye of the first and second images are preferably mapped to the mesh structure as linear combinations of the reference points.

In some embodiments comparing and modifying the brightness values of one or more of the corresponding pixels in the first image and/or the second image is performed according to a weighted average operation. In one embodiment the weighted average operation is:

$$c=(w(a)*g(a)+w(b)*g(b))/(w(a)+w(b)),$$

where c is an output pixel brightness value, a and b represent respective pixel brightness values of corresponding pixels of the first and second images being compared, w is a weighting function giving more weight or less weight to darker pixels and g is a gamma correction function performed on pixels a and b to produce resulting pixel c.

In some embodiments comparing and modifying the brightness values of one or more of the corresponding pixels in the first image and/or the second image is performed according to a threshold operation. In one embodiment the threshold operation is:

$$c=a \text{ if } (b>t \text{ and } a<=t),$$

where c is an output pixel brightness value, a and b represent respective pixel brightness values of corresponding pixels of the first and second images being compared and t represents a predefined brightness threshold.

In another embodiment the threshold operation is:

$$c=b \text{ if } (a>t \text{ and } b<=t)$$

where c is an output pixel brightness value, a and b represent respective pixel brightness values of corresponding pixels of the first and second images being compared and t represents a predefined brightness threshold.

In a further embodiment the threshold operation is:

$$c=(a+b)/2 \text{ if } (a>t \text{ and } b>t).$$

where c is an output pixel brightness value, a and b represent respective pixel brightness values of corresponding pixels of the first and second images being compared and t represents a predefined brightness threshold.

In some embodiments the processor is further adapted to perform one or more of gaze direction tracking, head pose tracking, eye closure frequency or times and subject facial recognition.

In some embodiments the first illumination condition includes activation of a first illumination device and deactivation of a second illumination device. The second illumination condition preferably includes activation of the second illumination device and deactivation of the first illumination device. Successive images are preferably captured during the first and second illumination conditions in an alternating manner.

In some embodiments a third illumination condition includes deactivation of both the first and second illumination devices. In these embodiments three successive images are captured during the first, second and third illumination conditions in a sequential manner and the three images are processed together as a triplet by the processor.

Preferably the controller and the processor are the same hardware.

In accordance with a second aspect of the present invention, there is provided an image processing method including the steps of:

selectively illuminating a face of a subject from at least two illumination angles;

capturing images of at least a portion of the subject's face including at least one eye such that different images are captured under at least a first illumination condition having first glare properties and a second illumination condition having second glare properties respectively; and fitting an eye shape model to the first and second images based on at least one detected characteristic of the at least one eye in the first and second images to obtain information on the position and shape of the at least one eye.

BRIEF DESCRIPTIONS of the DRAWINGS

FIG. 1 is an image of a driver or operator's face illustrating potential glare areas.

FIG. 2 a-c are illustrations of portions of sequential captured images illustrating eye position movement and a ghosting effect as a result of head or eye motion.

FIG. 4 is a block diagram illustrating one exemplary embodiment of an active controller for an imaging acquisition device and active illumination system.

Figure 6:
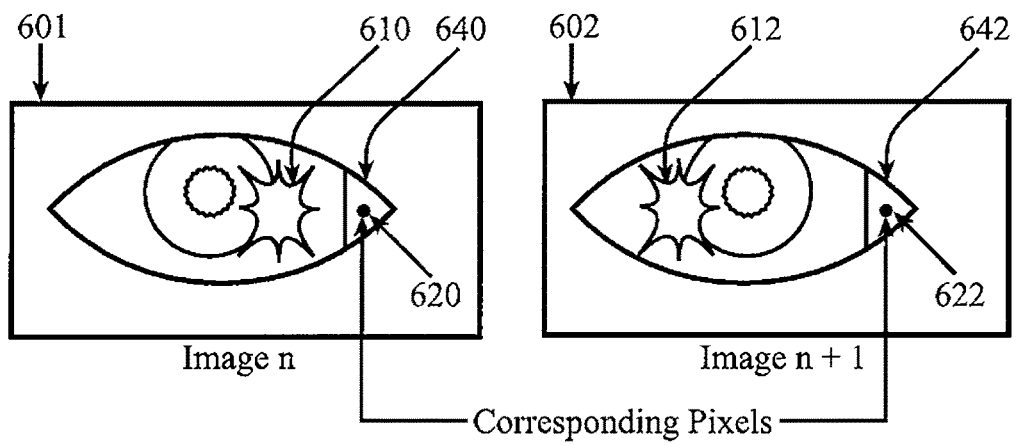

FIG. 6 a-c are illustrations of portions of sequential captured images showing eye position movement and pixel identification using a triangular mesh process.

Figure 7:
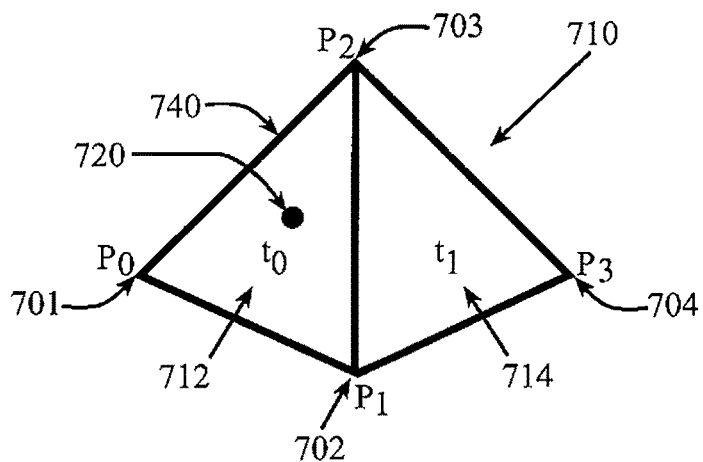

FIG. 7 is an illustration of a triangular mesh pixel identification.

Figure 8:
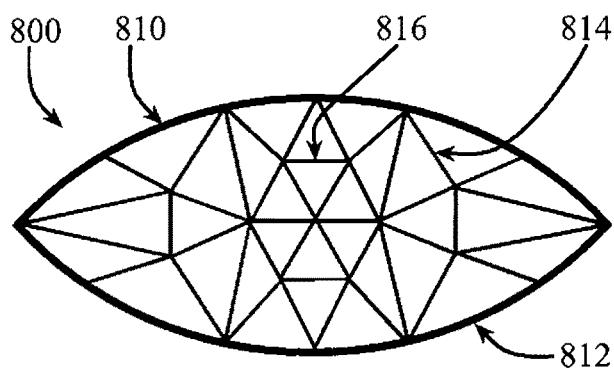

FIG. 8 is an illustration of a triangular mesh process applied to identify an eye shape.

DETAILED DESCRIPTION

Figure 1B:
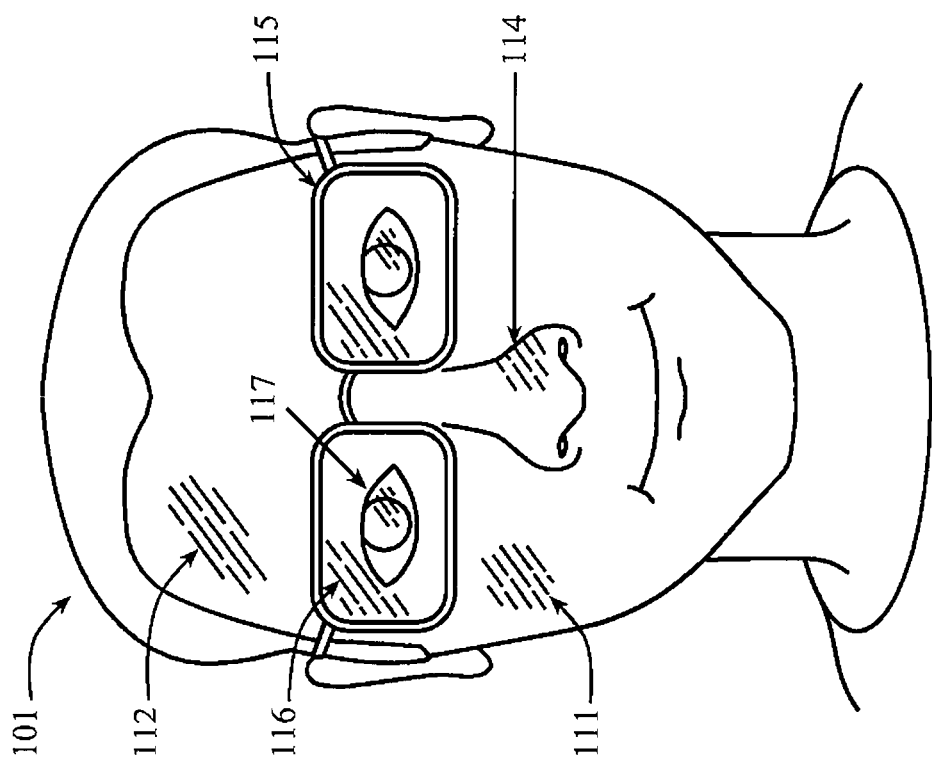
Figure 1A:
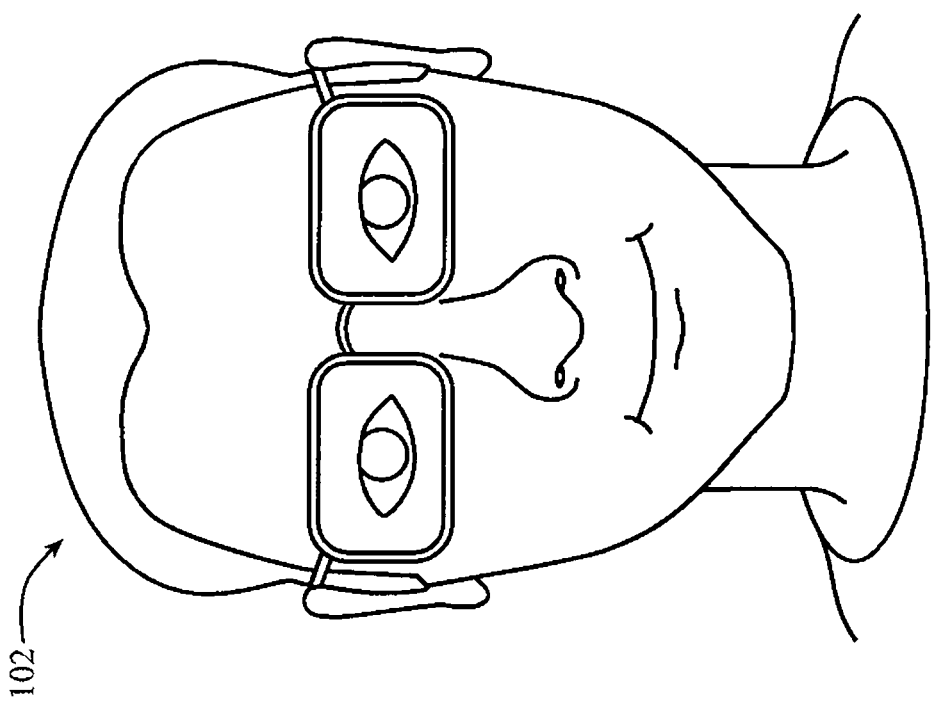

Referring to FIG. 1A, a subject's face or facial image 102 is shown without glare. Referring to FIG. 1B, a subject's face or facial image 101 may include glare or reflections when illuminated. For example, facial areas such as cheeks 111, forehead 112, the nose 114, eyeglass frames 115, eyeglass lenses 116, and the surface of eyes 117 themselves may reflect light and cause glare. The glare may distort or hide a portion or portions of the subject's facial image or features, such as the subject's eyes, which are being tracked or monitored.

Additionally, a problem with some systems is they do not account for facial and feature image motion between two consecutive frames, fields or images (three consecutive frames in the case of visible light subtraction). Captured or acquired sequential images of the same eye may have different positions resulting from head or eye motion. Referring to FIG. 2 A and B, for example, a subject's head has moved between image n, 204 and image n+1, 205 resulting in an eye position change. Referring to FIG. 2C, a pixel-wise min operation is performed using the two images 204, 205, and the resulting or post processing image 206 will contain defects, distortions, artifacts or ghosting eye images which can be very detrimental for the analysis of this image (e.g. eye or gaze tracking). In this example there will be 2 pupils for each detected eye image instead of a single pupil per eye. In the extreme case, the motion of the head could move the location of the glare in frame n to the same location of the glare in frame n+1, totally negating the intended glare reduction effect.

System Overview

Figure 3A:
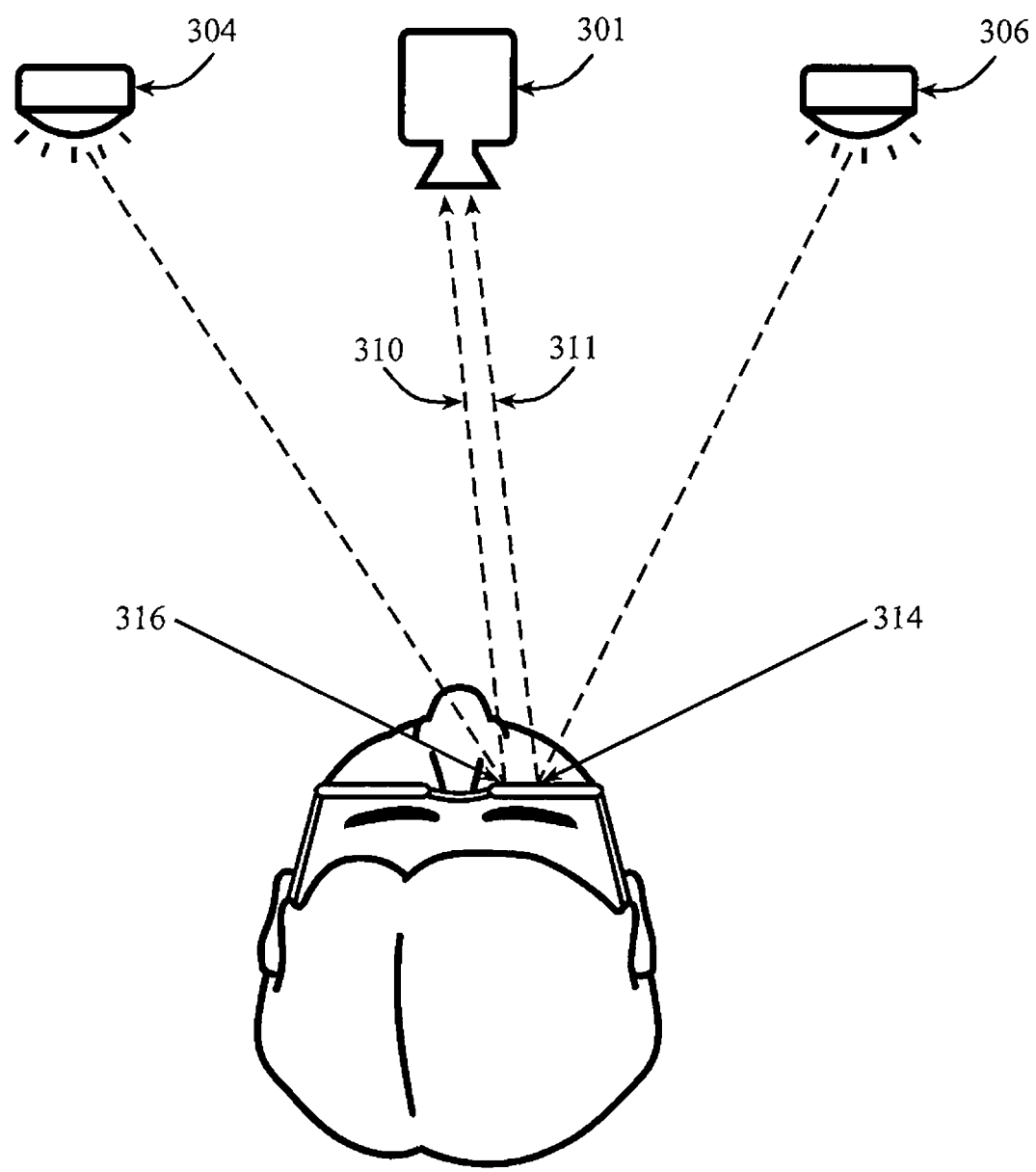
FIG. 3a is an illustrated image showing glare movement for an imaging acquisition device (camera) and two illumination devices (lights).

Referring to FIG. 3A, a subject's face or facial image is acquired using at least one imaging camera 301 and at least one illumination source (using visible light, infrared or other non-visible light source) 304 located at a first position. Typically, a facial image will include reflections or glare. When a second illumination source 306 located at a second position is used, facial images will also include reflections or glare. However, the locations of the reflections or glare from the second illumination source will be shifted to a different location on the face or on facial features in comparison to the locations of reflections or glare from the first illumination source. The illumination sources located in different positions provide different reflection angles 309 and 311, from the camera perspective, therefore shifting each corresponding glare spot on the subject's face or facial image.

Figure 3B:
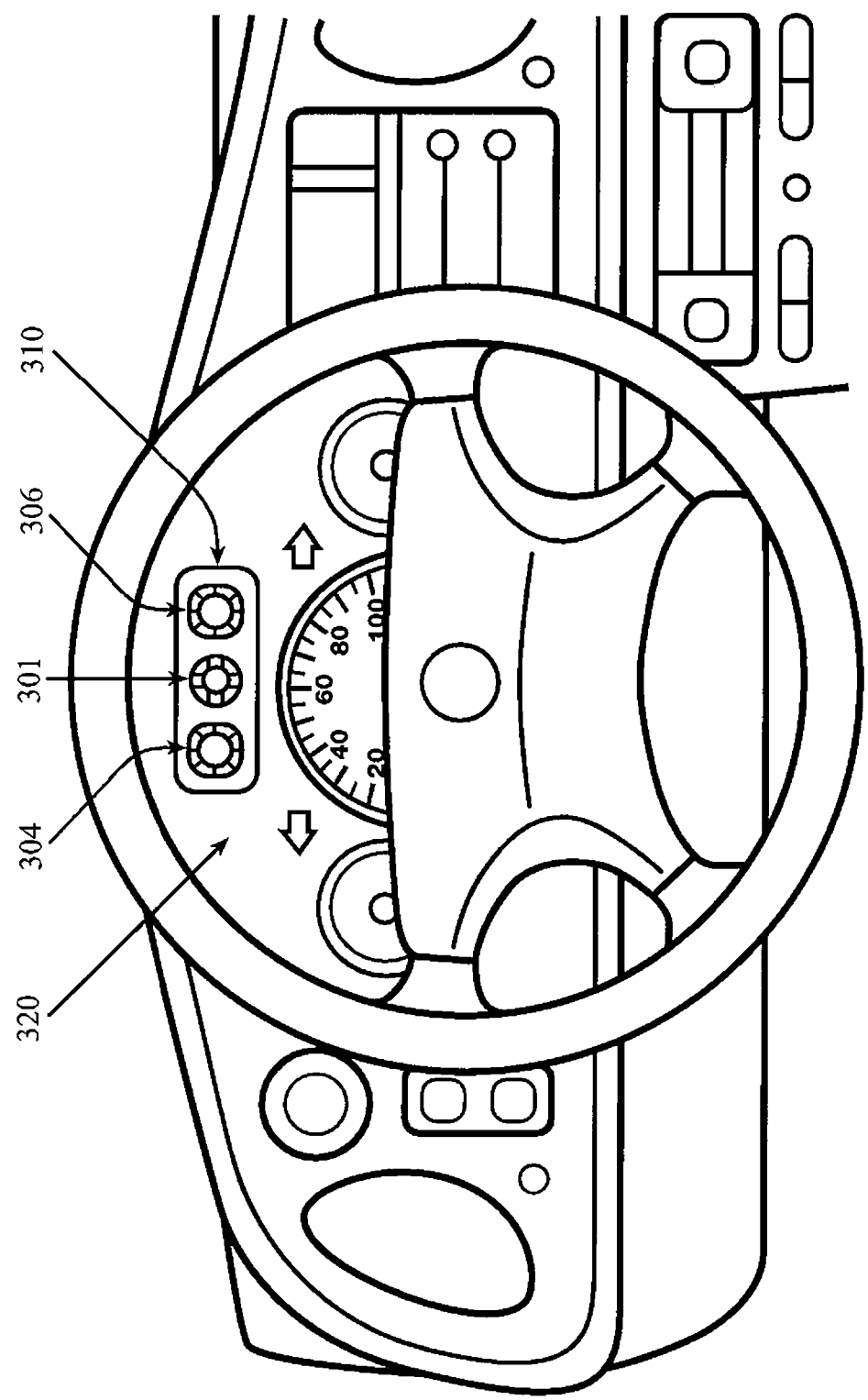
FIG. 3b is an image of a driver's view of single unit imaging camera and illumination sources

Referring to FIG. 3B, an imaging camera 301 and illumination sources may be manufactured or built as a single unit 310 or common housing containing a plurality of two or more illumination sources 304, 306 illuminating a subject driver from opposing sides of the subject's face. One embodiment is shown installed in a vehicle dash board 320. It should be appreciated that the system may include one or more cameras mounted in any location suitable to capture images of the head or facial features of a subject and/or passenger in the vehicle 10. It should further be appreciated that more than two light illumination sources may be employed in the system according to other embodiments. The illumination sources may be infrared (IR) or visible light illuminators. In other embodiments, a first and a second light illumination source each include a single light emitting diode (LED). According to other embodiments, the first and a second light illumination source may each include a plurality of LEDs.

In alternative embodiments, the illumination sources may be located at other locations or various positions to vary the reflective angles between the illumination sources, the driver's face and the camera. For example, in an automobile or vehicle, a single unit containing a camera and two illumination sources, with the illumination sources spaced apart by approximately 1 inch to 4 inches providing a difference in angles in the range of 2 to 8 degrees. The single unit may be placed in the dashboard or mounted on the steering column, conveniently positioned to view a driver's face and sufficiently positioned to capture successive images of the region where the subject (e.g., driver's head) is expected to be located during normal driving. The imaging camera captures at least a portion of the driver's head, particularly the face including one or both eyes and the surrounding ocular features.

Additional components of the system may also be included within the common housing or may be provided as separate components according to other embodiments.

Referring to FIG. 4, one embodiment of a vision system includes a camera 301, first 304 and second 306 illumination sources, a control unit 310, and vision processor 312. The vision processor 312 may be implemented with a microprocessor, or microprocessor in conjunction with custom or specialized circuitry, executing code stored in memory. The vision processor 312 also includes memory, such as random access memory (RAM), read-only memory (ROM), electrically erasable programmable read-only memory (EEPROM), and other equivalent memory or storage systems as should be readily apparent to those skilled in the art. The illumination control function may be implemented in the vision processor 312 or in any other processor or controller having adequate processing capability. The vision processor 312 and illumination controller 310 may be integrated together or may be implemented in separate hardware and/or software or firmware.

In each described embodiment, the camera 301, the control unit 310 or the vision processor 312 may each generate control signals for any or each of the other units 301, 310, 312. For example, in a first embodiment, synchronizing signals for the camera 301 and the control unit 310 are generated by the vision processor 312. In a second embodiment, the camera 301 generates synchronizing signals for the control unit 310 and a vision processor 312.

In a first embodiment of the control unit 310 operation, the control unit 310 provides output signals to control each of the first and second illumination sources 304, 306. The control unit 310 sequentially controls activation of the first and then second illumination sources 304, 306, activating each illumination source one at a time. In this embodiment, the first illumination source is turned on; the second illumination source is turned off, and vice versa. According to a second embodiment, the control unit operates in one of three states where 1) the first illumination source 304 is turned on with the second illumination source turned off, 2) the first illumination source 304 is turned off with the second illumination source turned on and 3) both illuminators are turned off. Other embodiments include the control unit generating signals which control the first and second illumination sources 304, 306 in a variety of states and patterns. Illumination of the subject by the different states of the illumination sources is referred to as 'illumination conditions'.

The first and second illumination sources 304, 306 are controlled in synchronicity with the camera 301, to sufficiently illuminate a subject so that the camera generates images that meet or exceed a quality level required by the vision processor. This includes setting a suitable exposure or integration time of the camera 301. Glare caused by other sources such as sunlight and other light sources may be identified when both the first and second illumination sources are turned off.

Figure 5A:
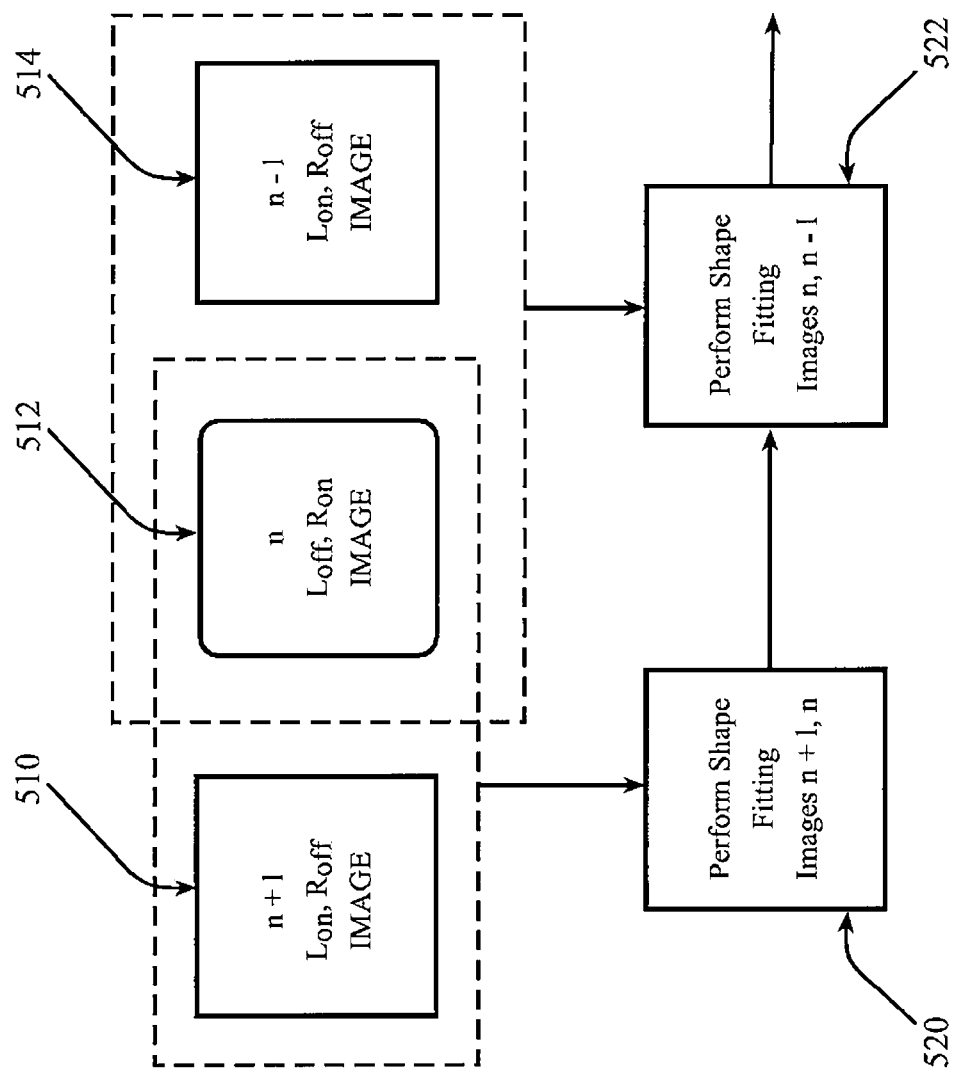
FIG. 5a is block diagram illustrating one exemplary embodiment of image acquisition timing and a shape fitting process.

Referring to FIG. 5A, the first embodiment generates a strobe pattern synchronized with the camera 301. The strobe pattern is generated by alternating illuminators 304, 306 which are labeled L, R, L, R, etc. For generating sequential images 510, 512 and 514, in a first step (n+1), the first illumination source L is turned on, and the second illumination source R is turned off to define a first illumination condition. The (n+1) image 510 is then captured by the vision processor 312 and camera 301 under this first illumination condition. In a second step (n), the first illumination source L is turned off, and the second illumination source R is turned on to define a second illumination condition. The (n) image 512 is then captured by the vision processor 312 and camera 301 under this second illumination condition. At step 520 the two consecutive images are then processed by the vision processor 312, performing an eye shape fitting routine, combining information from the two captured images. In this embodiment, eye shape-fitting is performed by combining information from both images and the process is repeated for adjacent pairs of captured images. For example, a subsequent image 514 captured under the first illumination condition is combined with image 512 and the eye shape fitting routine is applied to these two images at step 522. As a result, an eye shape fit is performed twice per individual image frame. Optionally, the two shape-fits are combined for a more robust result (e.g., use a best fit function according to a goodness of fit test). Another option is skipping the processing for a pair of images if the vision processor 312 power is limited. The steps for the first embodiment are repeated as additional sequential images are generated by the camera and synchronized illumination sources.

Example eye shape fitting routines are described in more detail below.

Figure 5B:
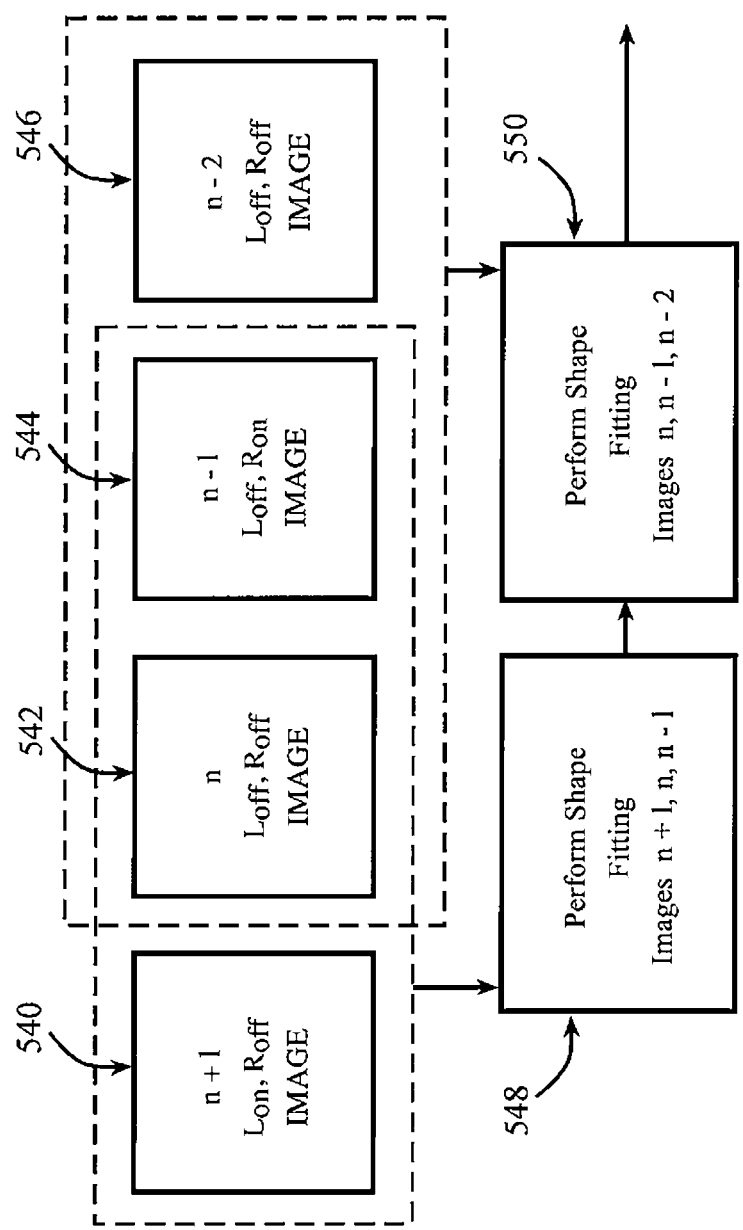
FIG. 5b is block diagram illustrating a third exemplary embodiment of image acquisition timing and a shape fitting process.

Referring to FIG. 5B, a third embodiment generates a strobe pattern synchronized with the camera 301. The strobe pattern is generated by alternating illuminators 304, 306 which are labeled L, R, L, R, etc. In the third image generation embodiment for generating sequential images, in a first step (n+1), the first illumination source L is turned on, and the second illumination source R is turned off to define a first illumination condition. The (n+1) image 540 is then captured by the vision processor 312 and camera 301. In a second step (n), the first illumination source L is turned off, and the second illumination source R is also turned off to define a second illumination condition. The (n) image 542 is then captured by the vision processor 312 and camera 301. In a third step (n−1), the first illumination source L is turned off, and the second illumination source R is turned on to define a third illumination condition. The (n−1) image 544 is then captured by the vision processor 312 and camera 301. In a fourth step (n−2), the first illumination source L is turned off, and the second illumination source R is also turned off to again set the second illumination condition. The (n−2) image 546 is then captured by the vision processor 312 and camera 301. At step 548 the three consecutive images (540, 542 and 546) are then processed by the vision processor, performing an eye shape fitting routine, combining information from the three captured images. In this embodiment, eye shape-fitting is performed by combining information from three images and the process is repeated for adjacent triplets of captured images. Accordingly, at step 550, the eye shape fitting routine is performed on the next image triplet including images 542, 544 and 546. As a result, an eye shape fit is performed three times per frame. Optionally, the three shape-fits are combined for a more robust result (e.g., use a best fit function according to a goodness of fit test). Another option is skipping the processing for the triplet images if the vision processor 312 power is limited. The steps for the third embodiment are repeated as additional sequential images are generated by the camera and synchronized illumination sources.

Other equivalent embodiments such as capturing and processing four or more images or implementing a routine similar or equivalent to an eye shape fit should be readily apparent to those skilled in the art.

Referring again to FIGS. 5A and B, the vision processor 312 receives images from the camera in successive fields, frames or images. The vision processor 312 includes a frame grabber or image storage circuitry for receiving and storing the successive images. A predetermined number of images are captured by the vision processor 312 and the vision processor then processes the images in a manner to reduce glare. As each sequential image is captured, a variety of routines are performed by the video processor implementing operations and calculations on the overall image and on individual pixels.

Eye Shape Fitting

Stored in the vision processor 312 memory are shape fitting routines and, optionally, glare removal routines, which are executable by the processor to perform various processing of the captured images. Generally, the eye shape fitting routine involves extracting eye shape features from each of the images in the pair or triplet and inputting these characteristics from each images to an eye model to determine overall eye characteristics, such as eye openness, eye position, or even eye gaze direction in the presence of glare. More generally, however, the eye model may not include the full eye shape but may simply be indicative of an eye openness value (say, normalised between 0 and 1).

The video processor 312 is also configured to perform one or more routines to recognize and identify facial features or characteristics of the subject. Additional exemplary routines may include but are not limited to position recognition, feature tracking (such as head tracking, eye tracking) and image area and/or pixel manipulation (such as image pixel functions and calculations) in determining an expected gaze vector of the subject, subject distraction, and subject drowsiness. In one embodiment, head tracking is performed to determine a head position or head pose, eye features are found and recognized, shape fitting and triangular mesh operations are performed for at least one eye, position differences between sequential eye images are identified by finding corresponding pixels, eye-image position changes are identified and the image is adjusted to compensate for the change in position for the subject glasses and then operators or functions are performed to reduce or eliminate glare.

Using at least two images as input, at least one algorithmic fitting operation is performed that produces at least one eye opening measurement. The algorithmic operation is performed using multiple images and operations or calculations are performed on individual pixels. The preferred approach is to identify one or more reference facial features in each image such as pupils, eye corners and points along the upper and lower eyelids. These identified reference facial features are applied to an eye shape model to characterise an overall eye shape. Although the head tracking may be performed on the entire images of the subject's face, the eye processing procedure is preferably performed on a subset or window of pixels around the identified eyes. The eye regions are selected through the identification of eye features such as pupils, eyelids and eye corners. Full pixel sets, i.e. full images are not combined into a single full image.

The algorithm that measures eye opening produces an eye opening measurement from this information. The eye opening measurement may be derived directly from the shape of the eye model or may be derived empirically from the image data using an eye openness determining technique. An exemplary technique for measuring an eye openness value from an identified eye shape is described in U.S. Pat. No. 7,043,056 to Edwards et al. entitled Facial Image Processing System and assigned to Seeing Machines Pty Ltd, the contents of which is incorporated herein by way of cross-reference. At no point during the computation is a combined image formed from the input images with a pixel-wise min operator (although min operation between pixels may be used for the computation of the eye opening signal, which could be replaced with the option mentioned above (involving facial feature identification) if necessary).

In one step, before identifying eyes or other facial features, a head tracking routine or step is processed before extracting eye images. The head tracker accurately locates the position of the eye in each frame, and hence allows compensation for motion of the head. Head motion artifacts are reduced with the head tracker, and in another step, eye motion artifacts are reduced with a 'shape fitting' routine. For the shape fitting routine, a triangular mesh operation is preferably used to compute pixel coordinates within the shape of an eye, instead of calculating nearest vertex and 2D offset. This triangular mesh operation is described below.

In some embodiments, the impact of glare in the images is reduced by extracting information about the eye shape, including eyelids, iris and pupil contour, from the model fit without having to analyze or generate the full image(s) captured by the camera. In other embodiments, only the degree of eye openness is extracted from the model fit. Referring to FIG. 6, an example of glare is shown in both images n and n+1. Eyelids are tracked and analyzed using multiple images. Eye shapes are fitted despite the presence of glare as the glare does not overlap the same part of the shape in image n and image n+1. Information from both images n and n+1 is used as an input to fit an eye shape model. Although typically the original pixel brightness and position values are used, in some embodiments minimum, maximum, and difference operators are used to modify pixel brightness values. Brightness values from multiple images in the regression process, for example, brightness in image n, brightness in image n+1, min brightness n, n+1, max brightness n, n+1, difference brightness n, n+1 are used in the process. The result is that, in these latter embodiments, the pixel brightness values of each image are modified depending on the detection of glare and the eye shape detected. However, fitting of eye features to an eye shape model does not require modification of the pixel brightness values—the pixel position of the features can be directly mapped to the eye model.

The operation or function of the algorithm is more robust in identifying the presence of glare and large shape variations such as an eye closure since the glare is not located on the same part of the shape in images n and n+1. Any motion, for example head motion, eye closure, gaze change, etc., will be taken into account since the pixel coordinates are relative to the shape of the fitted eye model. During the fitting process, information such as pixel value (brightness and or/coordinates) in image n, corresponding pixel value, in the shape coordinates and in image n+1, a minimum pixel value between the 2 pixels, a difference or a pixel value between the 2 pixels, a maximum pixel value between the 2 pixels may be used. A decision on which pixels to use and which pixel value to use, brightness, min brightness, max brightness, difference brightness is learned by the vision processor during a previous off-line training process step.

To generate the eye model, the vision processor is configured to run a machine learning algorithm to 'learn' eye shapes based on off-line training using test data. The test data preferably includes eye images from many different subjects in many different states (eye closure states and eye directions). The off-line training generates an eye model which is used as a fit for the captured images. In some embodiments, the eye model represents a 2D or 3D shape of an eye which is defined by reference points referred to as 'landmarks'. Exemplary landmarks include pupils, eye corners and points along the upper and lower eyelids. The landmarks in the model are matched to corresponding identified eye features in the images and the model is fit to the image. Even in the presence of glare, if a sufficient number of landmark features can be identified from the two or three images captured under different illumination conditions, a confident fit may be applied. In another embodiment, the eye model represents simply a degree of eye openness.

Suitable machine learning algorithms include fern-based algorithms or convolutional neural networks. Both of these processes rely on determining rules or patterns in data based on learning from a large set of training data. An exemplary fern-based algorithm that could be utilised in the present invention is described in US Patent Application Publication 2014/0185924 to Xudong, et al. entitled "Face alignment by explicit shape regression" and assigned to Microsoft Corporation. An exemplary algorithm utilising convolutional neural networks is described in Sun, Yi, Xiaogang Wang, and Xiaoou Tang. "Deep convolutional network cascade for facial point detection" Computer Vision and Pattern Recognition (CVPR), 2013 IEEE Conference on. IEEE, 2013. The machine learning processes can be used to identify not only different eye shapes but degrees of eye closure also. With sufficient training, the vision processor is able to 'learn' to disregard glare information and focus instead on the parts of the image that are glare free. In the case of fern-based algorithms, the identification of landmark points is required. Algorithms utilising a convolutional neural network may not require the identification of landmark points but rather, information such as the degree of eye openness may be derived directly from the images and the offline training data. Details of a fern-based algorithm are described below.

Based on the number of identified landmarks, a mesh model of an eye can be built. The mesh represents a reference system for mapping the eyes identified in the different images. The greater the number of landmarks defined, the finer the mesh structure. FIG. 7 illustrates a three-dimensional triangular mesh 710 with four vertices ($P_0$, $P_1$, $P_2$, $P_3$) and two triangles, ($t_0 = P_0$, $P_1$, $P_2$) ($t_1 = P_1$, $P_2$, $P_3$). A triangular mesh function or routine models the eye shape and identifies the position of single pixels within the shape. The single pixels are indexed by a triangle index and weights to the 3 vertices of a triangle. The pixel P 720 coordinates relate to triangle index "t" with associated weighted coordinates ($t_0 = w_0$, $w_1$, $w_2$), such that $P = w_0 * P_0 + w_1 * P_1 + w_2 * P_2$. That is, the pixel positions are represented as a linear combination of the triangle vertices. In one shape fitting embodiment, the algorithmic operation uses a 'shape fitting' method or routine that will fit the eye shape (pupil, iris, eyelids) in both images n and n+1. In an alternative embodiment, n+1, n+2 are optionally used in the case of visible light subtraction. The pixel coordinates for the fitting process are relative to the shape of the eye in each image, not fixed in image coordinates.

Referring now to FIG. 8, an exemplary triangular mesh for an eye shape is shown, identifying upper 810 and lower 812 eyelids, iris contour 814, and pupil contour 816. The algorithmic approach starts with an initial shape in the image, then refines the shape in multiple steps using the image texture and corresponding 'shape increments' that have been learned from an offline training process on a sufficiently large quantity of annotated images. The shape fitting algorithm eliminates 'image ghosting' effects and artifacts produced by head or eye motion using a 'shape regression' algorithm.

Glare Reduction

Using the above procedure, the characteristics of the subject's eye or eyes can be determined from the fitted eye shape model in the presence of glare. During the fitting procedure, additional glare reduction procedures may be performed. For example, the positions of corresponding pixels in sequential images can be mapped to the fixed coordinates of the model. The vision processor then proceeds to perform pixel operations to minimize glare in the eye regions of the images. Each of the following functions are used or implemented as individual embodiments or other embodiments may include multiple functions that are serially combined. Generally, threshold methods or functions are used however other functions may be applied.

Several implementations of applied functions are described below.

One embodiment or function takes the form of a weighted average operation:

$$c=(w(a)*g(a)+w(b)*g(b))/(w(a)+w(b)),$$

where w is a weighting function giving more weight or less weight to darker pixels and g is a gamma correction function performed on pixels a and b to produce a resulting pixel c.

An alternative embodiment or function using a defined threshold takes the form of:

$$c=a \text{ if } (b>t \text{ and } a<=t),$$

where t represents a given brightness threshold. Another alternative embodiment or function using a defined threshold takes the form of:

$$c=b \text{ if } (a>t \text{ and } b<=t)$$

And yet another alternative embodiment or function using a defined threshold takes the form of:

$$c=(a+b)/2 \text{ if } (a>t \text{ and } b>t) \text{ with t a defined threshold.}$$

Also, another embodiment or function uses a minimum operation between pixels, where $$I=\min (L, R), \text{ on corresponding pixels}$$

The above described glare reduction functions are applied as modifications to pixel brightness values in the existing images to modify the relevant pixels affected by glare. That is, only the pixels that exceed the threshold or satisfy the criteria are modified. No additional or composite image is generated from the sequential image pair or triplets.

Reduced glare images allow for enhanced imagery, which is particularly advantageous for use in a vehicle where a subject, such as the driver of a vehicle, may be wearing corrective lenses and glare may be present in the captured image. While two illumination sources are shown and described herein, it should be appreciated that the illumination and imaging system may employ more than two illumination sources located at various locations.

Embodiments described herein are intended to cover any adaptations or variations of the present invention. Although the present invention has been described and explained in terms of particular exemplary embodiments, one skilled in the art will realize that additional embodiments can be readily envisioned that are within the scope of the present invention.

The claims defining the invention are as follows:

1. An image processing system including:
two or more illumination devices positioned to selectively illuminate a face of a subject from respective illumination angles;
a camera positioned to capture images of at least a portion of the subject's face including at least one eye;
a controller configured to control the illumination devices and camera such that a first image is captured under a first illumination condition having first glare properties and a second image is captured under a second illumination condition having second glare properties, wherein the first and second illumination conditions are defined by the illumination devices; and
a processor adapted to fit an eye model to the first and second images based on at least one detected characteristic of the at least one eye in the first and second images to obtain information on the position and shape of the at least one eye,
wherein the processor is further configured to:
determine corresponding pixels from the first and second images that relate to the same region of the at least one eye;
compare the brightness values of the corresponding pixels; and
selectively modify brightness values of one or more of the corresponding pixels in the first image and/or the second image to reduce glare.

2. An image processing system according to claim 1 wherein the at least one characteristic includes an eye position and the processor is further adapted to process the first and second images to determine a position of the at least one eye in the images.

3. An image processing system according claim 1 wherein the at least one characteristic includes a degree of eye openness and the processor is further adapted to perform an eye opening measurement to determine a degree of openness of the at least one eye.

4. An image processing system according to claim 1 wherein the eye model is generated based on machine learning of a set of training data.

5. An image processing system according to claim 4 wherein the machine learning includes performing a fern-based regression algorithm.

6. An image processing system according to claim 4 wherein the machine learning includes performing a convolutional neural network algorithm.

7. An image processing system according to claim 5 wherein the model includes at least one reference point defined by one or more of a pupil, eye corners and points along an upper and lower eyelid.

8. An image processing system according to claim 7 wherein the model includes a mesh structure defined with respect to the at least one reference point.

9. An image processing system according to claim 8 wherein the mesh structure includes triangular elements with three vertices.

10. An image processing system according to claim 8 wherein coordinates of pixels in regions of the at least one eye of the first and second images are mapped to the mesh structure as linear combinations of the reference points.

11. An image processing system according to claim 1 wherein comparing and modifying the brightness values of one or more of the corresponding pixels in the first image and/or the second image is performed according to a weighted average operation.

12. An image processing system according to claim 11 wherein the weighted average operation is:

$$c=(w(a)*g(a)+w(b)*g(b))/(w(a)+w(b)),$$

where c is an output pixel brightness value, a and b represent respective pixel brightness values of corresponding pixels of the first and second images being compared, w is a weighting function giving more weight or less weight to darker pixels and g is a gamma correction function performed on pixels a and b to produce resulting pixel c.

13. An image processing system according to claim 1 wherein comparing and modifying the brightness values of one or more of the corresponding pixels in the first image and/or the second image is performed according to a threshold operation.

14. An image processing system according to claim 13 wherein the threshold operation is:

$$c=a \text{ if } (b>t \text{ and } a<=t),$$

where c is an output pixel brightness value, a and b represent respective pixel brightness values of corresponding pixels of the first and second images being compared and t represents a predefined brightness threshold.

15. An image processing system according to claim 13 wherein the threshold operation is:

$$c=b \text{ if } (a>t \text{ and } b<=t)$$

where c is an output pixel brightness value, a and b represent respective pixel brightness values of corresponding pixels of the first and second images being compared and t represents a predefined brightness threshold.

16. An image processing system according to claim 13 wherein the threshold operation is:

$$c=(a+b)/2 \text{ if } (a>t \text{ and } b>t).$$

where c is an output pixel brightness value, a and b represent respective pixel brightness values of corresponding pixels of the first and second images being compared and t represents a predefined brightness threshold.

17. An image processing system according to claim 1 wherein the processor is further adapted to perform one or more of gaze direction tracking, head pose tracking, eye closure frequency or times and subject facial recognition.

18. An image processing system according to claim 1 wherein the at least one characteristic includes a pupil contour and the processor is further adapted to process the first and second images to determine a direction of eye gaze.

19. An image processing method including the steps of:
selectively illuminating a face of a subject from at least two illumination angles;
capturing images of at least a portion of the subject's face including at least one eye such that different images are captured under at least a first illumination condition having first glare properties and a second illumination condition having second glare properties respectively;
fitting an eye model to the first and second images based on at least one detected characteristic of the at least one eye in the first and second images to obtain information on the position and shape of the at least one eye;
determining corresponding pixels from the first and second images that relate to the same region of the at least one eye;
comparing the brightness values of the corresponding pixels; and
selectively modify brightness values of one or more of the corresponding pixels in the first image and/or the second image to reduce glare whilst fitting the eye model.

* * * * *